(12) United States Patent
Merchant

(10) Patent No.: US 6,321,946 B1
(45) Date of Patent: Nov. 27, 2001

(54) FUSIONMATE TWO PART ADHESIVE DISPENSING SYSTEM

(75) Inventor: Bhavesh B. Merchant, Peabody, MA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/466,382

(22) Filed: Dec. 17, 1999

(51) Int. Cl.$^7$ .................................................. B67D 5/52
(52) U.S. Cl. ................. 222/135; 222/145.4; 222/255; 222/275; 222/288; 222/334
(58) Field of Search ................................. 222/135, 134, 222/145.7, 145.6, 145.5, 145.4, 145.1, 256, 255, 254, 252, 267, 265, 263, 275, 288, 334

(56) References Cited

U.S. PATENT DOCUMENTS

| | | | |
|---|---|---|---|
| 3,236,419 | * 2/1966 | DeRemer et al. | 222/135 |
| 4,228,924 | 10/1980 | Gilbert | 212/63 |
| 4,505,405 | * 3/1985 | Kelly et al. | 222/135 |
| 4,777,906 | 10/1988 | Mourning et al. | 118/106 |
| 5,388,761 | 2/1995 | Langeman | 239/1 |
| 5,690,254 | * 11/1997 | Moretti | 222/135 |
| 5,868,319 | 2/1999 | Gilmore | 239/290 |

OTHER PUBLICATIONS

VRG Meter–Mixer, GS Manufacturing, Costa Mesa, California.
Rapid–Pro Series, Ashby Cross Company, Inc., Topsfield, Massachusetts.
Roto–Ratio Continuous Flow Metering, EMC$^2$ Company, Sterling Heights, MI.

* cited by examiner

Primary Examiner—Kevin Shaver
Assistant Examiner—Patrick Buechner
(74) Attorney, Agent, or Firm—Pitney, Hardin, Kipp & Szuch LLP

(57) ABSTRACT

A two-component resin or adhesive dispensing system comprises a pair of activator and resin or adhesive metering pumps and a drive motor. The drive motor is a hydraulic drive motor driven by means of a hydraulic pump which, in turn, is driven by means of an air motor coupled thereto. The metering pumps are separately and independently driven by the hydraulic drive motor through means of sprocket and chain drive systems, and the metering pumps are mounted upon adjustably movable mounting brackets such that their relative disposition may be readily altered so as to accommodate different sized sprocket members which will then alter the drive output of the metering pumps in order to change the ratio of the amount of activator material dispensed with respect to the amount of resin or adhesive material dispensed.

23 Claims, 5 Drawing Sheets

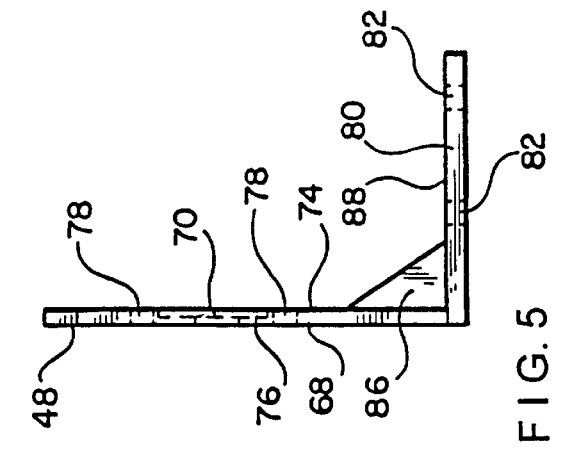
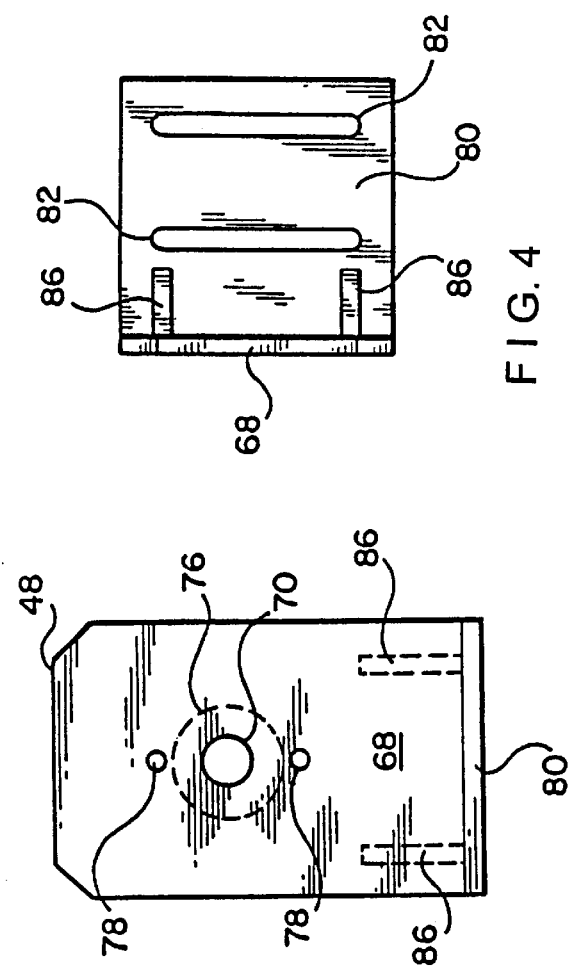
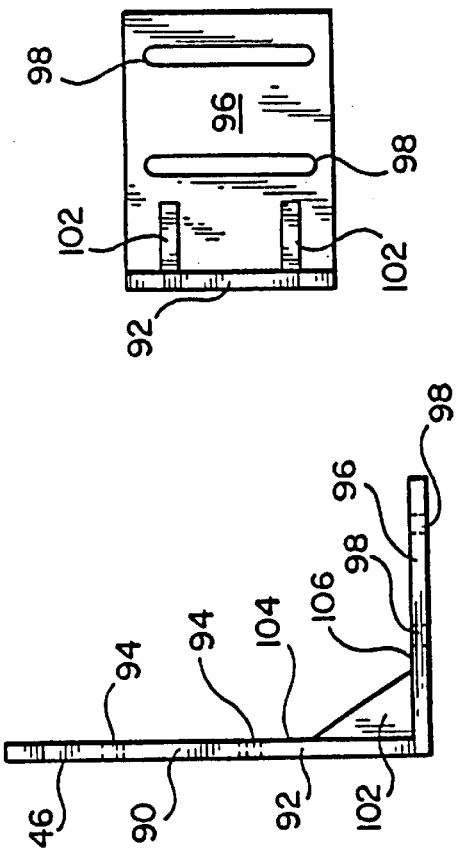

FUSIONMATE TWO PART ADHESIVE DISPENSING SYSTEM

FIELD OF THE INVENTION

The present invention relates generally to resin or adhesive dispensing systems, and more particularly to a new and improved resin or adhesive dispensing system wherein the relative amount of a resin or an adhesive to be dispensed, with respect to its associated activator, can be readily and easily changed or altered depending upon the particular resin or adhesive being dispensed, the operating or ambient temperature conditions, and the like, such that a predeterminedly desired ratio of resin or adhesive with respect to its associated activator is achieved.

BACKGROUND OF THE INVENTION

Two part or multi-component dispensing systems for dispensing resins, adhesives, acrylic materials, urethanes, and the like are of course well-known and are currently marketed by various manufacturers, such as, for example, $EMC^2$ of Sterling Heights, Michigan, GS Manufacturing of Costa Mesa, Calif., and Ashby Cross Company, Inc. of Topsfield, Mass. While the systems manufactured and marketed by such companies are of course satisfactory from an operational point of view, several operational drawbacks or disadvantages commonly characteristic of such systems do exist.

For example, most of the known multi-component dispensing systems comprise a drive motor operatively connected to a pair of metering pumps which serve to dispense, for example, an adhesive material and an associated activator. In accordance with a first well-known type of system, however, the metering pumps are usually gear driven by means of a driving gear mounted upon the drive motor. Consequently, if it is desired to change or alter the relative outputs, amounts, or ratios of the adhesive and activator components being dispensed, due for example to the fact that a different proportion or ratio of the resin or adhesive material with respect to its associated activator is required to be used as a result of the use of different adhesives in connection with different applications, or as a result of the use of particular resins or adhesives under different operating or ambient temperature conditions, the conventional dispensing systems cannot readily accommodate or achieve such alterations or changes without major changes or alterations to the drive motor and metering pump assemblies. In particular, for example, the size of the drive motor driving gear, or the size of the metering pump driven gears enmeshed with the drive motor driving gear, cannot be readily changed or altered because the drive motor and metering pumps are mounted at relatively fixed positions with respect to each other. Accordingly, changing the size of the various driving or driven gears alters the center-to-center distances defined between the driving and driven gears which cannot be physically accommodated within the system.

In accordance with a second well-known type of system, the metering pumps are operatively driven by the drive motor through means of a suitable chain drive mechanism or system. However, again, in order to alter or change the output drive of the metering pumps, the various sprocket components, chains, idlers, and the like need to be changed which is quite time-consuming and results in a substantially extensive amount of system down-time. In addition, it is also important that the resin or adhesive metering pump and the activator metering pump be able to be separately or independently operated or driven by means of the drive motor. There are several reasons for this requirement. Firstly, it is important to operate the metering pumps separately or independently in order to properly calibrate or test the pumps so as to ensure, for example, that each pump is dispensing the desired amount of material. Along these lines, it is important to be able to calibrate the metering pumps separately or independently in order not to waste material which would therefore be dispensed by means of the other metering pump not being calibrated or tested.

Secondly, in a similar manner, if one of the metering pumps develops, experiences, or exhibits an operational problem, it is again important from the viewpoint of being able to conserve resources or materials to be able to service or perform required maintenance upon such inoperative metering pump without having to operate or run the operative metering pump. In accordance with the conventional chain-driven drive motor and metering pump systems, however, such separate or independent operation of the metering pumps is not possible because both metering pumps are driven by the drive motor in a serial manner. In other words, the driving arrangement is such that the drive motor is operatively connected to a first one of the metering pumps so as to drive such metering pump, and such first metering pump is then in turn operatively connected to the second metering pump. Consequently, in view of the fact that both of the metering pumps are not directly driven by the drive motor, but to the contrary, the second metering pump is driven by the first metering pump, both metering pumps are not able to be separately or independently driven by the drive motor. If the second metering pump is to be driven or operated, then the first metering pump must also be driven or operated.

A need therefore exists in the art for a new and improved resin or adhesive dispensing system wherein the relative amount of a resin or an adhesive to be dispensed, with respect to its associated activator, can be readily and easily changed or altered depending upon the particular resin or adhesive being dispensed, the operating or ambient temperature conditions, and the like, such that a predeterminedly desired ratio of resin or adhesive with respect to its associated activator is achieved. In addition, there is also a need in the art for a new and improved adhesive or resin dispensing system wherein the adhesive or resin and activator metering pumps are capable of being separately and independently driven by means of the drive motor such that each one of the metering pumps can be separately and independently calibrated, serviced, and maintained without operating the other metering pump such that resin, adhesive, or activator materials are not needlessly wasted.

OBJECTS OF THE INVENTION

Accordingly, it is an object of the present invention to provide a new and improved resin or adhesive dispensing system.

Another object of the present invention is to provide a new and improved resin or adhesive dispensing system which effectively overcomes the various operational disadvantages or drawbacks characteristic of the prior art or conventional dispensing systems.

An additional object of the present invention is to provide a new and improved resin or adhesive dispensing system wherein the relative amount of a resin or an adhesive to be dispensed, with respect to its associated activator, can be readily and easily changed or altered depending upon the particular resin or adhesive being dispensed, the operating or ambient temperature conditions, and the like, such that a predeterminedly desired ratio of resin or adhesive with respect to its associated activator is achieved.

A further object of the present invention is to provide a new and improved resin or adhesive dispensing system wherein the adhesive or resin and activator metering pumps are capable of being separately and independently driven by means of the drive motor such that each one of the metering pumps can be separately and independently calibrated, serviced, and maintained without operating the other metering pump such that resin, adhesive, or activator materials are not needlessly wasted.

SUMMARY OF THE INVENTION

The foregoing and other objectives are achieved in accordance with the teachings and principles of the present invention through the provision of a new and improved resin or adhesive dispensing system which comprises a hydraulic drive motor, an adhesive metering pump disposed upon a first side of the drive motor, and in activator metering pump disposed upon a second side of the drive motor. The drive motor and metering pumps comprise sprocket members such that chain drives respectively interconnecting the drive motor drive sprocket and the metering pump driven sprockets enable the hydraulic drive motor to independently drive the adhesive and activator metering pumps. In addition, the drive motor and metering pumps are mounted upon mounting brackets which are mounted upon a support platform of a portable cart so as to be laterally adjustable. In this manner, utilization of the laterally adjustable mounting brackets permit differently sized sprocket members to be mounted, for example, upon the activator metering pump so as to alter the discharge or output amount of the activator pump relative to the output or discharge of the adhesive metering pump whereby the ratio of the activator with respect to the adhesive is able to be readily achieved.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts through-out the several views, and wherein:

FIG. 3 is a front elevational view of the support bracket for mounting the hydraulic drive motor of the new and improved resin or adhesive dispensing system illustrated in FIG. 1;

FIG. 4 is a top plan view of the hydraulic drive motor support bracket as illustrated in FIG. 3;

FIG. 5 is a side elevational view of the hydraulic drive motor support bracket as illustrated in FIGS. 3 and 4;

FIG. 6 is a front elevational view of the support bracket for mounting the activator metering pump of the new and improved resin or adhesive dispensing system illustrated in FIG. 1;

FIG. 7 is a side elevational view of the activator metering pump support bracket as illustrated in FIG. 6;

FIG. 8 is a top plan view of the activator metering pump support bracket as illustrated in FIGS. 6 and 7;

DETAILED DESCRIPTION OF THE PREFERRED EMBODIMENT

Figure 1:
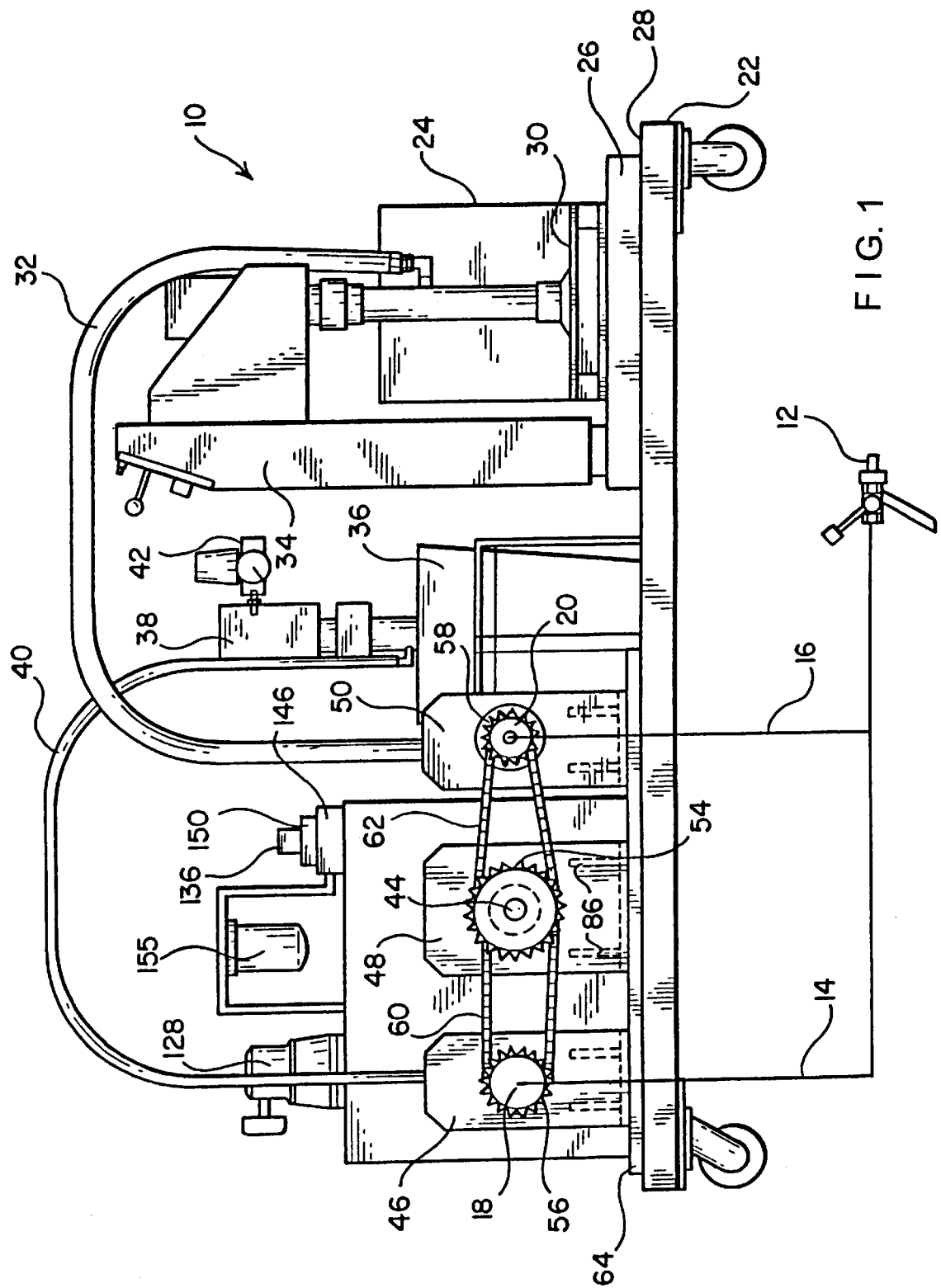
FIG. 1 is a side elevational, partially schematic view of the new and improved resin or adhesive dispensing system constructed in accordance with the principles and teachings of the present invention and illustrated as being mounted upon a portable cart.

Referring now to the drawings, and more particularly to FIG. 1 thereof, the new and improved resin or adhesive dispensing system constructed in accordance with the principles and teachings of the present invention is illustrated therein and is generally indicated by the reference character 10. The resin or adhesive dispensing system 10 comprises a dispensing gun 12, and activator and resin or adhesive components of the material mixture to be dispensed are respectively supplied to the dispensing gun 12 through means of conduits 14 and 16 which are fluidically connected to output ports of an activator metering pump 18 and a resin or adhesive metering pump 20. All of the components of the dispensing system 10 are adapted to be supported or mounted upon a portable wheeled cart 22 such that the entire dispensing system 10 is rendered portable for use in various locations as may be desired or required.

More particularly, a supply tank 24, for supplying the resin or adhesive material to the resin or adhesive material metering pump 20, is mounted upon a first support platform 26 which is affixed to an upper support surface 28 of the portable wheeled cart 22, and a resin or adhesive material transfer pump 30 is disposed within the supply tank 24. In this manner, when activated, the resin or adhesive material transfer pump 30 can pump or supply the resin or adhesive material from the supply tank 24 to the resin or adhesive material metering pump 20 through means of a fluid conduit 32. It is to be noted that the resin or adhesive material transfer pump 30 comprises a conventional piston pump, and air pressure controls therefor are mounted upon, for example, an operator console 34.

In a similar manner, a supply tank 36, for supplying the activator material to the activator material metering pump 18, is also mounted upon the upper support surface 28 of the portable wheeled cart 22, and an activator material transfer pump 38 is operatively associated with the supply tank 36. In this manner, similar to the operation of the resin or adhesive material transfer pump 30, when activated, the activator material transfer pump 38 can pump or supply the activator material from the supply tank 36 to the activator material metering pump 18 through means of a fluid conduit 40. An air pressure gauge 42 is also disclosed as being operatively associated with the activator material transfer pump 38, and as was the case with the resin or adhesive material transfer pump 30, the activator material transfer pump 38 comprises a conventional piston pump. Further details of such transfer pumps are therefore omitted herefrom as not being necessary for the appreciation and understanding of the present invention.

Figure 2:
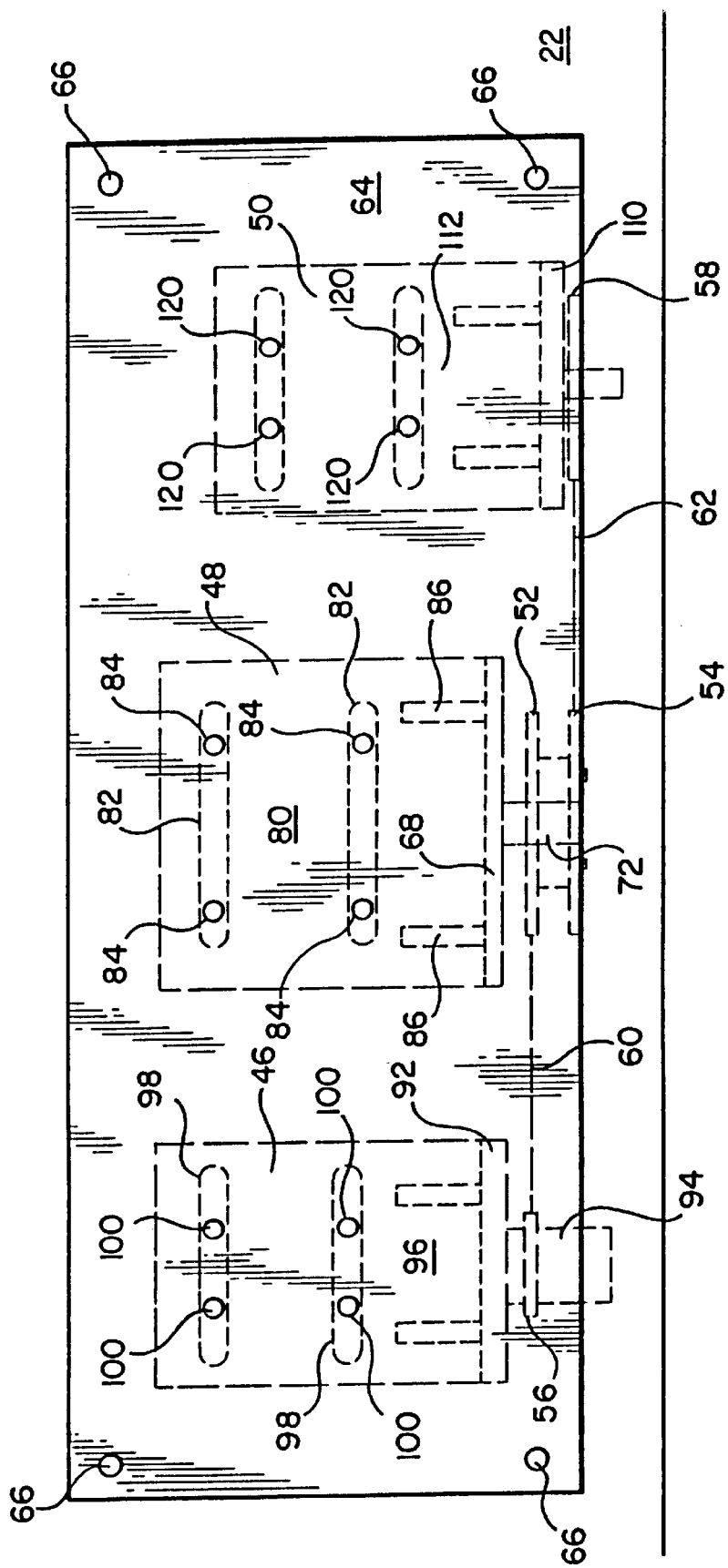
FIG. 2 is a top plan view of a support platform which is to be fixedly mounted upon the portable cart of the new and improved resin or adhesive dispensing system of the present invention for, in turn, mounting the support brackets for respectively mounting the drive motor, the activator metering pump, and the adhesive metering pump, upon the support platform wherein the brackets, the motor, and the metering pumps are illustrated in phantom lines.
Figure 10:
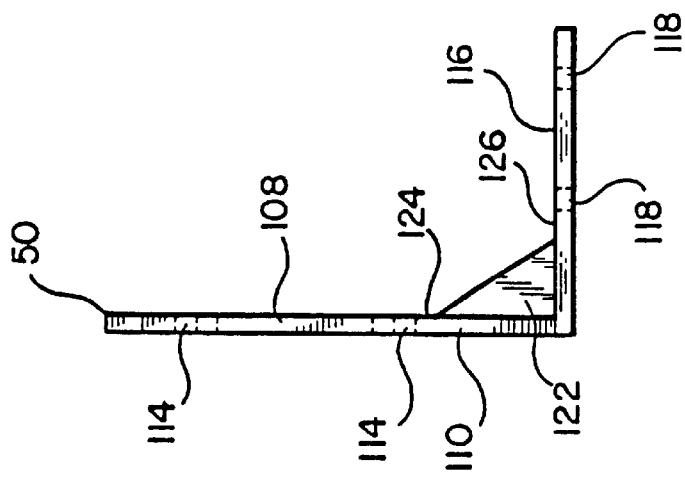
FIG. 10 is a side elevational view of the adhesive metering pump support bracket as illustrated in FIG. 9.

In accordance with one of the primary features characteristic of the present invention, the activator material metering pump 18 and the resin or adhesive material metering pump 20 are adapted to be driven by means of a hydraulic drive motor 44, and as best seen in FIG. 1, the hydraulic drive motor 44 is interposed between the activator material metering pump 18 and the resin or adhesive material metering pump 20 such that both the activator material metering pump 18 and the resin or adhesive material metering pump 20 are driven directly by the hydraulic drive motor 44. More particularly, with additional reference being made to FIGS. 2–11, it is seen that the activator material metering pump 18, the hydraulic drive motor 44, and the resin or adhesive material metering pump 20 are respectively mounted upon mounting brackets 46,48,50 which have substantially L-shaped cross-sectional configurations as best seen in FIGS. 5,7, and 10. In addition, as best seen in FIG. 2, the hydraulic drive motor 44 has a pair of axially spaced, externally toothed sprocket members 52,54 mounted thereon, and the activator material metering pump 18 is likewise provided with an externally toothed sprocket member 56 while the resin or adhesive material metering pump 20 is similarly provided with an externally toothed sprocket member 58. Drive chains 60,62 are also provided for respectively interconnecting the activator material metering pump sprocket member 56 and the resin or adhesive material metering pump sprocket member 58 to the hydraulic drive motor sprocket members 52 and 54.

In this manner it can be appreciated that either one or both of the activator material or the resin or adhesive material metering pumps 18,20 can be separately or independently driven, or driven together, by means of the hydraulic drive motor 44 as a result of the selective connection or disconnection of the drive chains 60,62 between the sprocket members 56,58 of the activator material and resin or adhesive material metering pumps 18,20 and the sprocket members 52,54 of the hydraulic drive motor 44. Driving of the two activator material and resin or adhesive material metering pumps 18,20 in combination with each other is of course desired in order to provide the dispensing gun 12 with the appropriate activator and resin or adhesive material mixture ratio, while separate or independent driving of the activator material and resin or adhesive material metering pumps 18,20 is desirable when, for example, calibration, maintenance, start-up, and other similar servicing operations are necessarily being performed upon only one of the metering pumps such that material from the other metering pump is not unnecessarily wasted.

Continuing further, and with reference still being made to FIGS. 1–11, another primary feature characteristic of the present invention resides in the fact that as a result of the particular aforenoted arrangement or disposition of the activator material and resin or adhesive material metering pumps 18,20 with respect to the hydraulic drive motor 44, if it should be desired to alter the particular ratio of the activator material with respect to the resin or adhesive material, such an alteration, adjustment, or the like is readily achievable by changing, for example, the sprocket member 56 mounted upon the activator material metering pump 18.

For example, a particular activator material metering pump sprocket member 56 has a predetermined number of teeth integrally formed thereon, and it may be replaced by or exchanged with another sprocket member which has a different predetermined number of teeth integrally formed thereon. In this manner, when the activator material and resin or adhesive metering pump sprocket members 56,58 are rotated by means of the hydraulic drive motor sprocket members 52,54 through means of the drive chains 60,62, the rotational output of activator material metering pump sprocket member 56 will have been altered or changed, as a result of the different number of external teeth integrally formed thereon, whereby the material dispensing output of the activator material metering pump 18 will have been correspondingly altered or changed.

In order to achieve the particular replacement or exchange of the sprocket member 56 mounted upon the activator material metering pump 18, as well as to similarly replace the sprocket members 52, 54, 58 respectively mounted upon the adhesive material metering pump 20 and the hydraulic drive motor 44, and in order to provide for the relative lateral movement of the activator material and resin or adhesive material metering pumps 18,20, and the hydraulic drive motor 44, with respect to each other as may be required attendant the replacement or exchange of the various sprocket members 52, 54, 56, 58 of the hydraulic drive motor 44, the activator material metering pump 18, and the resin or adhesive material metering pump 20, the mounting brackets 46, 48, 50 respectively mounting the activator material metering pump 18, the hydraulic drive motor 44, and the resin or adhesive material metering pump 20, are mounted upon a second support platform 64 so as to be laterally adjustable thereon. The second support platform 64 is affixed to the portable wheeled cart 22 by means of suitable bolt fasteners or the like 66, as best seen in FIG. 2, and the mounting brackets 46,48,50 are mounted upon the second support platform 64 so as to be slidably adjustable thereon in opposite lateral directions.

More particularly, with additional reference being made to FIGS. 3–11, and as has been noted hereinbefore, each one of the mounting brackets 46,48,50 has a substantially L-shaped configuration in cross-section comprising a vertically disposed leg or section and a horizontally disposed leg or section. In connection, for example, with the mounting bracket 48 for the hydraulic drive motor 44, as best seen in FIGS. 3–5, the vertically disposed leg or section 68 of the mounting bracket 48 is provided with a central bore 70 through which projects an output shaft 72 of the hydraulic drive motor 44, and the rear face 74 of the vertical leg or section 68 is provided with a counterbored portion 76 concentrically disposed about the central bore 70 for mounting the front face of the hydraulic drive motor 44.

The sprocket members 52,54 are mounted upon the forward end of the output shaft 72 of the hydraulic drive motor 44 so as to be disposed forwardly of the vertically disposed leg or section 68 of the mounting bracket 48. Apertures 78 are also provided upon the vertical leg or section 68 of the mounting bracket 48 for receiving suitable fasteners, not shown, by means of which the hydraulic drive motor 44 is fixedly secured upon the vertical leg or section 68 of the mounting racket 48.

The hydraulic driving motor mounting bracket 48 further comprises a horizontally disposed leg or section 80 within which a pair of laterally disposed slots 82,82 are defined. Suitable fasteners 84 as seen in FIG. 2, are adapted to pass through the slots 82,82 and into threaded bores, not shown, defined within the support platform 64 such that when the fasteners 84 are loosened, the lateral disposition of the hydraulic motor mounting bracket 48 may be laterally adjusted whereas when the fasteners 84 are tightened, the lateral disposition of the hydraulic motor mounting bracket 48 is fixed with respect to the support platform 64. In this manner, the exchange or replacement of particular sprocket members can be readily achieved and accommodated as a result of the relative disposition of the metering pump and drive motor mounting brackets 46,48,50 and the metering pumps 18,20 and the drive motor 44 mounted thereon, the positional adjustments of the metering pump and drive motor mounting brackets 46,48,50 with respect to each other, and the disengagement and re-engagement of the drive chains 60,62 between the drive motor 44 and the metering pumps 18,20 as permitted by such positional adjustments of the metering pump and drive motor mounting brackets 46,48, 50. A pair of triangular shaped weldments 86,86 are respectively affixed to the rear face 74 of the vertically disposed leg or section 68 of the mounting bracket 48 as well as to the upper surface 88 of the horizontally disposed leg or section 80 of the mounting bracket 48 so as to provide the requisite rigidity and strength to the mounting bracket 48.

With specific reference now being made to FIGS. 6–8, the mounting bracket 46 for the activator material metering pump 18 is shown and it is seen that the mounting bracket 46 is quite similar to the mounting bracket 48 for the hydraulic drive motor 44 with the major exceptions being the fact that the mounting bracket 46 for the activator material metering pump 18 is not provided with a counter-bored region as is the hydraulic drive motor mounting bracket 48, and the fact that a relatively large aperture 90 is defined within the vertically disposed leg or section 92 of the mounting bracket 46 so as to permit the rotary shaft 94 of the activator material metering pump 18 to extend therethrough. The sprocket member 56 is mounted upon a forward region of the rotary shaft 94 of the activator material metering pump 18 so as to be disposed forwardly of the vertically disposed leg or section 92 of the mounting bracket 46.

In a manner similar to the hydraulic drive motor mounting bracket 48, apertures 94 are also provided upon the vertically disposed leg or section 92 of the mounting bracket 46 for receiving suitable fasteners, not shown, by means of which the activator material metering pump 18 is fixedly secured upon the vertically disposed leg or section 92 of the mounting bracket 46. The activator material metering pump mounting bracket 46 further comprises a horizontally disposed leg or section 96 within which a pair of laterally disposed slots 98,98 are defined. Suitable fasteners 100, as may be seen in FIG. 2, are adapted to pass through the slots 98,98 and into threaded bores, not shown, defined within the support platform 64 such that when the fasteners 100 are loosened, the activator material metering pump mounting bracket 46 may be laterally adjusted, whereas when the fasteners 100 are tightened, the lateral disposition of the activator material metering pump mounting bracket 46 is fixed with respect to the support platform 64. A pair of triangular shaped weldments 102,102 are respectively affixed to the rear face 104 of the vertically disposed leg or section 92 of the mounting bracket 46 as well as to the upper surface 106 of the horizontally disposed leg or section 96 of the mounting bracket 46 so as to provide the requisite rigidity and strength to the mounting bracket 46.

Figure 11:
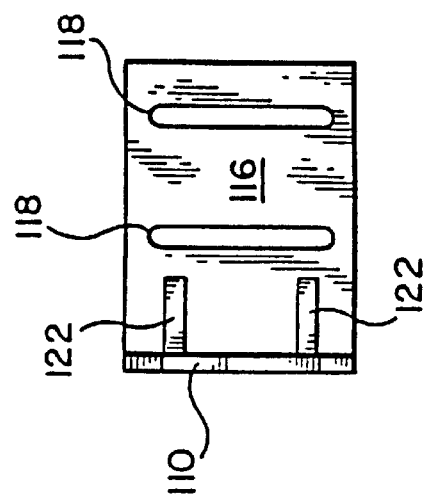
FIG. 11 is a top plan view of the adhesive metering pump support bracket as illustrated in FIGS. 9 and 10.
Figure 9:
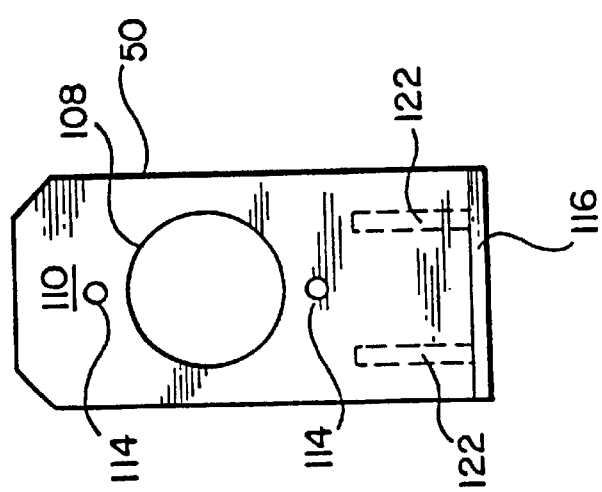
FIG. 9 is a front elevational view of the support bracket for mounting the adhesive metering pump of the new and improved resin or adhesive dispensing system illustrated in FIG. 1.

With reference now being made to FIGS. 9–11, the resin or adhesive material metering pump mounting bracket 50 is illustrated and shown therein, and it will be appreciated that the resin or adhesive material metering pump mounting bracket 50 is essentially or substantially the same as the activator material metering pump mounting bracket 46 except for the precise sizes or dimensions of the various components thereof. More particularly, therefore, it is seen that a relatively large aperture 108 is defined within the vertically disposed leg or section 110 of the mounting bracket 50 so as to permit the rotary shaft 112 of the resin or adhesive material metering pump 20 to extend therethrough. The sprocket member 58 is mounted upon a forward region of the rotary shaft 112 of the resin or adhesive material metering pump 20 so as to be disposed forwardly of the vertically disposed leg or section 110 of the mounting bracket 50. In a manner similar to the hydraulic drive motor mounting bracket 48, as well as the activator material metering pump mounting bracket 46, apertures 114 are also provided upon the vertically disposed leg or section 110 of the mounting bracket 50 for receiving suitable fasteners, not shown, by means of which the resin or adhesive material metering pump 20 is fixedly secured upon the vertically disposed leg or section 110 of the mounting bracket 50. The resin or adhesive material metering pump mounting bracket 50 further comprises a horizontally disposed leg or section 116 within which a pair of laterally disposed slots 118,118 are defined. Suitable fasteners 120, as may be seen in FIG. 2, are adapted to pass through the slots 118,118 and into threaded bores, not shown, defined within the support platform 64 such that when the fasteners 120 are loosened, the resin or adhesive material metering pump mounting bracket 50 may be laterally adjusted, whereas when the fasteners 120 are tightened, the lateral disposition of the resin or adhesive material metering pump mounting bracket 50 is fixed with respect to the support platform 64. A pair of triangular shaped weldments 122,122 are respectively affixed to the rear face 124 of the vertically disposed leg or section 110 of the mounting bracket 50 as well as to the upper surface 126 of the horizontally disposed leg or section 116 of the mounting bracket 50 so as to provide the requisite rigidity and strength to the mounting bracket 50.

Figure 12:
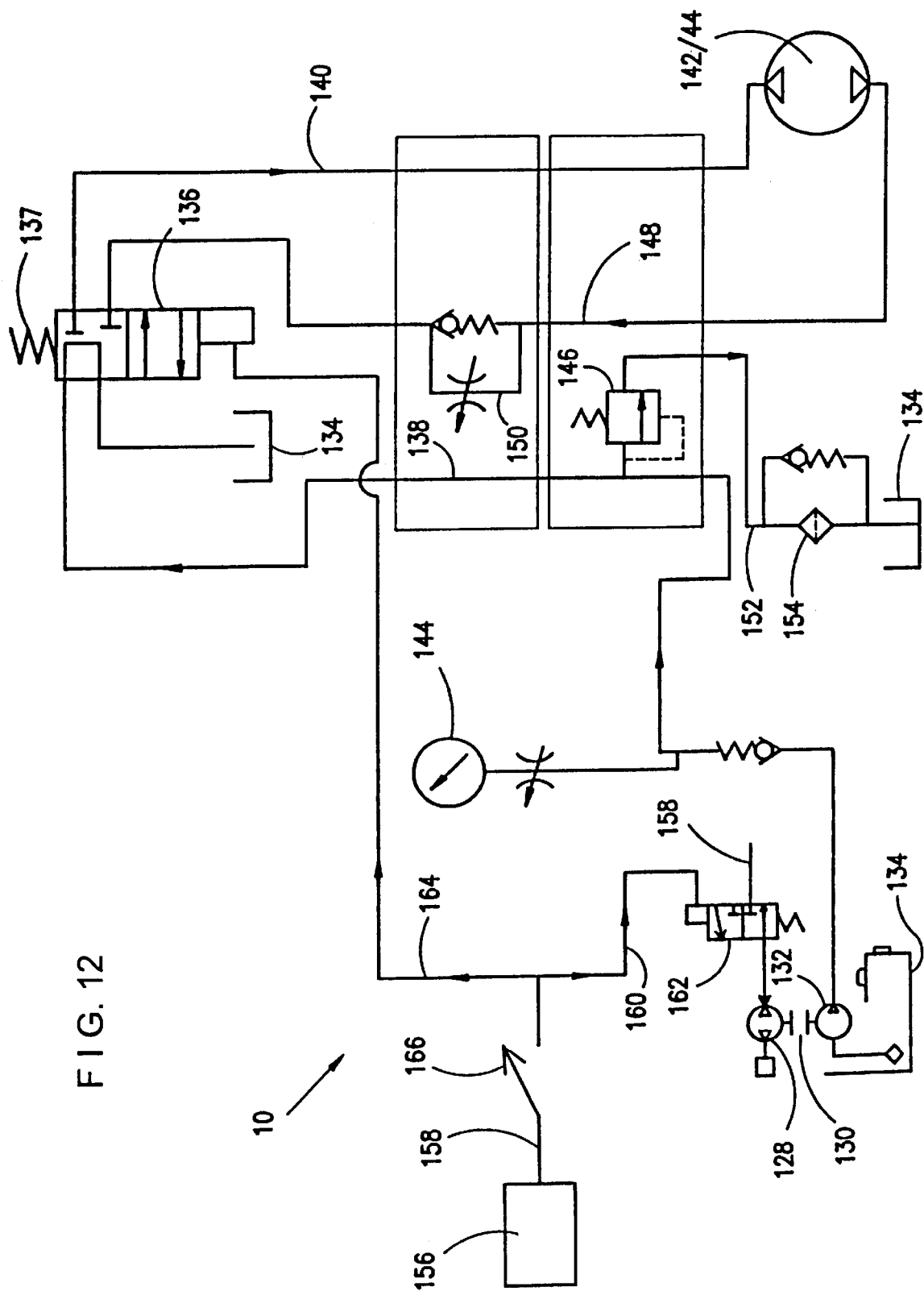
FIG. 12 is a schematic fluidic circuit diagram illustrating the various pneumatic and hydraulic control lines and mechanisms operatively associated or utilized with the various pneumatic and hydraulic components of the new and improved resin or adhesive dispensing system as illustrated in FIG. 1.

Turning lastly to FIG. 12, there is disclosed a 25 fluidic circuit diagram. More particularly, it will be appreciated that in accordance with the arrangement and utilization of the particular components parts comprising the new and improved resin or adhesive dispensing system 10 of the various powered components of the system 10 are pneumatic and hydraulic. This enables the use of manufacturing plant air, which is readily available and plentiful, as a source of power, and in addition, the use of such fluidicallly powered components eliminates the use of, for example, electrically powered motor drive components which can sometimes have the potential to explode and are hazardous to use within plant environments.

With reference then being made to FIG. 12, the new and improved resin or adhesive dispensing system 10 of the present invention is seen to comprise an air motor 128 which is also shown in FIG. 1 and which is operatively coupled by means of a coupling 130 to a hydraulic pump 132. The hydraulic pump 132 is disposed within a hydraulic oil tank 134, and consequently, when the hydraulic pump 132 is activated, the hydraulic pump 132 provides hydraulic fluid or oil to a first, spring-biased two-position directional control valve 136 through means of a first hydraulic fluid line or conduit 138. The two-position directional control valve 136 is illustrated as being in its normally CLOSED position or state as a result of the biasing force of its operatively associated spring member 137, however, when the two-position directional control valve 136 is activated or moved to its alternative OPENED state or position, the two-position directional control valve 136 is opened such that hydraulic oil or fluid is able to be transmitted by means of a second hydraulic fluid conduit or line 140 to a hydraulic motor 142/44 which in fact comprises, or is the same as, the hydraulic drive motor 44 illustrated in FIG. 1. A pressure gauge 144 is fluidically connected to the first hydraulic fluid conduit or line 138 so as to monitor the pressure of the hydraulic fluid or oil being conducted or transmitted to the hydraulic motor 142/44 through means of the two-position directional control valve 136, and an adjustable pressure-relief valve 146 is likewise fluidically connected to the first hydraulic fluid conduit 138 so as to properly control or maintain the pressure of the hydraulic oil or fluid being conducted to the two-position directional control valve 136 for transmission, in turn, to the hydraulic drive motor 142/44.

A third hydraulic fluid line or conduit 148 fluidically connects the hydraulic drive motor 142/44 back to the two-position directional control valve 136, and a flow control valve 150 is operatively associated with the third hydraulic fluid line or conduit 148 so as to properly control the flow of hydraulic fluid or oil through the hydraulic drive motor 142/44. It is to be appreciated that when the two-position directional control valve 136 is disposed at its OPENED state or position, hydraulic fluid or oil passing through the third hydraulic fluid line or conduit 148 and flow control valve 150 is then able to be returned to the hydraulic oil tank 134. In a similar manner, the adjustable pressure-relief valve 146 is likewise fluidically connected to the hydraulic oil tank 134 by means of a fourth hydraulic fluid or oil conduit or return line 152 within which there is disposed a return line filter mechanism 154. The two-position directional control valve 136, the pressure relief valve 146, and the flow control valve 150 are also illustrated within FIG. 1, and it is further seen from FIG. 1 that an oil filter 155 is operatively connected to the hydraulic drive motor 44 so as to filter the hydraulic fluid which is outputted from the hydraulic drive motor 44 and which is being returned to the hydraulic oil tank 134.

In order to activate the air motor 128 as well as the first two-position directional control valve 136, a source of high-pressure compressed air, which is readily available within the manufacturing plant or facility, is shown at 156, and such high-pressure compressed air is supplied to the system 10 by means of a pneumatic fluid or air supply line or conduit 158. A first pneumatic fluid or air signal line or conduit 160 fluidically connects the pneumatic fluid or air supply line or conduit 158 to the air motor 128 through means of a second, spring-biased two-position directional control valve 162, and a second pneumatic fluid or air signal line or conduit 164 fluidically connects the pneumatic fluid or air supply line or conduit 158 to the first, spring-biased two-position directional control valve 136. A pneumatic trigger switch 166 is operatively disposed within the pneumatic fluid or air supply line or conduit 158 and is located upon the dispensing gun 12 illustrated in FIG. 1, and in this manner, when the pneumatic trigger switch 166 is activated or depressed so as to attain its CLOSED position or state, high-pressure compressed air signals are simultaneously transmitted to both of the first and second two-position directional control valves 136 and 162. Consequently, air motor 128 is enabled as a result of being driven by high-pressure compressed air delivered thereto by means of a second branch of the pneumatic supply line 158, which is routed through means of a suitable manifold, not shown, so as to operate or drive the hydraulic pump 132, and the hydraulic drive motor 142/44 is likewise enabled as a result of hydraulic fluid or oil being conducted thereto from hydraulic pump 132 and through means of the first two-position directional control valve 136. In a similar but reverse manner, when the pneumatic trigger switch 166 is released and thereby disposed at its OPENED state, high-pressure compressed air is no longer supplied to either one of the first or second two-position directional control valves 136 and 162, and accordingly, activation or drive of the air motor 128, through means of the second two-position directional control valve 162, and activation of the hydraulic drive motor 142/44, through means o the first two-position directional control valve 136, are simultaneously terminated.

Thus, it may be seen that in accordance with the principles and teachings of the present invention, a new and improved resin or adhesive material dispensing system has been provided and disclosed. The new and improved resin or adhesive dispensing system enables the activator material and resin or adhesive material metering pumps to be separately or independently driven by or from the hydraulic drive motor which is important for calibration, servicing, and maintenance operations; the activator and resin or adhesive material metering pumps, as well as the hydraulic drive motor, are mounted upon laterally adjustable mounting brackets so as to facilitate the exchange or replacement of different sized sprocket members operatively mounted upon the rotary shafts of the metering pumps and the drive motor whereby different mixture ratios of the activator material with respect to the resin or adhesive material may be readily and simply achieved; and the hydraulic drive motor is driven by means of a hydraulic pump which, in turn, is driven by means of an air motor coupled thereto, the air motor being driven by compressed air readily available in the manufacturing plant or facility such that electrically powered motor drives are rendered unnecessary and are eliminated.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A two-component mixture dispensing system, comprising:

a first metering pump for dispensing first component of a two-component mixture;

a second metering pump for dispensing a second component of said two-component mixture;

a drive motor for driving said first and second metering pumps;

drive chains operatively interconnecting said drive motor to said first and second metering pumps for directly driving both of said first and second metering pumps by said drive motor, and for driving each one of said first and second metering pumps by said drive motor separately and independently with respect to the other one of said first and second metering pumps;

a pair of axially spaced sprocket members are mounted upon said drive motor;

a first sprocket member is mounted upon said first metering pump;

a second sprocket member is mounted upon said second metering pump; and said drive chains comprise a first drive chain operatively interconnecting a first one of said pair of axially spaced sprocket members mounted upon said drive motor and said first sprocket member mounted upon said first metering pump, and a second drive chain operatively interconnecting a second one of said pair of axially spaced sprocket members mounted upon said drive motor and said second sprocket member mounted upon said second metering pump.

2. The system as set forth in claim 1, wherein:
said first and second metering pumps are mounted upon opposite lateral sides of said drive motor.

3. The system as set forth in claim 1, wherein:
said drive motor comprises a hydraulic drive motor.

4. The system as set forth in claim 3, further comprising:
an air motor; and
a hydraulic pump operatively coupled to said air motor so as to be driven by said air motor when said air motor is driven;
said hydraulic drive motor being hydraulically connected to said hydraulic pump by a hydraulic fluid conduit so as to be driven by hydraulic fluid transmitted by said hydraulic pump through said hydraulic fluid conduit, and so as to, in turn, drive said first and second metering pumps when said hydraulic drive motor is operatively driven by said hydraulic fluid transmitted by said hydraulic pump through said hydraulic fluid conduit.

5. The system as set forth in claim 4, further comprising:
a source of high-pressure compressed air comprising a pneumatic fluid supply conduit fluidically connecting said source of high-pressure compressed air to said air motor for supplying pneumatic air from said source of high-pressure compressed air to said air motor;
a first two-position directional control valve disposed within said hydraulic fluid conduit fluidically connecting said hydraulic pump to said hydraulic drive motor;
a first compressed air signal line fluidically connecting said pneumatic fluid supply line of said source of high-pressure compressed air to said first two-position directional control valve so as to move said first two-position directional control valve from a CLOSED state, at which hydraulic fluid is prevented from being transmitted from said hydraulic pump to said hydraulic motor, to an OPENED state at which hydraulic fluid is permitted to be transmitted from said hydraulic pump to said hydraulic motor when said first two-position directional control valve receives a first air signal from said source of high-pressure compressed air;
a second two-position directional control valve disposed within said pneumatic fluid supply conduit fluidically connecting said source of high-pressure compressed air to said air motor; and
a second compressed air signal line fluidically connecting said pneumatic fluid supply conduit to said second two-position directional control valve so as to move said second two-position directional control valve from a CLOSED state, at which pneumatic fluid is prevented from being transmitted from said source of high-pressure compressed air to said air motor, to an OPENED state at which pneumatic fluid is permitted to be transmitted from said source of high-pressure compressed air to said air motor when said second two-position directional control valve receives a second air signal from said source of high-pressure compressed air.

6. The system as set forth in claim 5, further comprising:
a dispensing gun; and
a pneumatic switch mounted upon said dispensing gun for opening and closing said pneumatic fluid supply conduit so as to respectively simultaneously terminate operation of said hydraulic motor and said air motor as a result of deactivation of said first and second two-position directional control valves when said pneumatic switch is disposed at its OPENED state, and to respectively simultaneously initiate operation of said hydraulic motor and said air motor as a result of activation of said first and second two-position directional control valves when said pneumatic switch is disposed at its CLOSED state.

7. The system as set forth in claim 1, further comprising:
means for adjustably mounting at least one of said first and second metering pumps with respect to said drive motor so as to accommodate different drive means for said at least one of said first and second metering pumps with respect to said drive motor whereby different amounts of a first one of said first and second components of said two-component mixture, with respect to the second one of said first and second components of said two-component mixture, may be dispensed by said first and second metering pumps.

8. The system as set forth in claim 7, wherein said adjustable mounting means comprises:
a support platform; and
at least one mounting bracket, upon which said at least one of said first and second metering pumps is mounted, movably mounted upon said support platform.

9. The system as set forth in claim 8, further comprising:
at least one slot defined within said at least one mounting bracket; and
at least one fastener disposed with in said slot and engaged with said support platform for permitting said at least one mounting bracket to be moved to a selected position when said at least one fastener is disposed in a loosened state with respect to said support platform, and for fixing said at least one mounting bracket at said selected position when said at least one fastener is disposed in a tightened state with respect to said support platform.

10. A two-component mixture dispensing system, comprising:
a first metering pump for dispensing a first component of a two-component mixture;
a second metering pump for dispensing a second component of said two-component mixture;
a drive motor for driving said first and second metering pumps;
drive chains operatively interconnecting said drive motor to said first and second metering pumps for directly driving both of said first and second metering pumps by said drive motor, and for driving each one of said first and second metering pumps by said drive motor separately and independently with respect to the other one of said first and second metering pumps;
a pair of axially spaced sprocket members are mounted upon said drive motor;
a first sprocket member is mounted upon said first metering pump;
a second sprocket member is mounted upon said second metering pump; and
said drive chains comprise a first drive chain operatively interconnecting a first one of said pair of axially spaced sprocket members mounted upon said drive motor and said first sprocket member mounted upon said first metering pump, and a second drive chain operatively interconnecting a second one of said pair of axially spaced sprocket members mounted upon said drive motor and said second sprocket member mounted upon said second metering pump; and means for adjustably mounting at least one of said first and second metering pumps with respect to said drive motor so as to accommodate different sprocket members for said at least one of said first and second metering pumps with respect to said drive motor whereby different amounts of a first one of said first and second components of said two-component mixture, with respect to the second one of said first and second components of said two-component mixture, may be dispensed by said first and second metering pumps.

11. A two-component mixture dispensing system, comprising a first metering pump for dispensing a first component of a two-component mixture;

a second metering pump for dispensing a second component of said two-component mixture;

a drive motor for driving said first and second metering pumps;

means for adjustably mounting at least one of said first and second metering pumps with respect to said drive motor so as to accommodate different drive means for said at least one of said first and second metering pumps with respect to said drive motor whereby different amounts of a first one of said first and second components of said two-component mixture, with respect to the second one of said first and second components of said two-component mixture, may be dispensed by said first and second metering pumps wherein:

said first and second metering pumps are mounted upon opposite lateral sides of said drive motor.

12. A two-component mixture dispensing system, comprising:

a first metering pump for dispensing a first component of a two-component mixture;

a second metering pump for dispensing a second component of said two-component mixture;

a drive motor for driving said first and second metering pumps;

means for adjustably mounting at least one of said first and second metering pumps with respect to said drive motor so as to accommodate different drive means for said at least one of said first and second metering pumps with respect to said drive motor whereby different amounts of a first one of said first and second components of said two-component mixture, with respect to the second one of said first and second components of said two-component mixture, may be dispensed by said first and second metering pumps wherein:

said drive motor comprises a hydraulic drive motor.

13. A two-component mixture dispensing system comprising:

a first metering pump for dispensing a first component of a two-component mixture;

a second metering pump for dispensing a second component of said two-compartment mixture;

an air motor;

a hydraulic pump operatively coupled to said motor so as to be driven by said air motor when said air motor is driven;

a hydraulic drive motor hydraulically connected to said hydraulic pump by a hydraulic fluid conduit so as to be driven by hydraulic fluid transmitted by said hydraulic pump through said hydraulic fluid conduit, and operatively connected to said first and second metering pumps so as to, in turn, drive said first and second metering pumps when said hydraulic drive motor is operatively driven by said hydraulic fluid transmitted by said hydraulic pump through said hydraulic fluid conduit; and means for adjustably mounting at least one of said first and second metering pumps with respect to said drive motor so as to accommodate different drive means for said at least one of said first and second metering pumps with respect to said drive motor whereby different amounts of a first one of said first and second components of said two-component mixture, with respect to the second one of said first and second components of said two-component mixture, may be dispensed by said first and second metering pumps wherein said adjustable mounting means comprises a support platform and at least one mounting bracket, upon which said at least one of said first and second metering pumps is mounted, movably mounted upon said support platform.

14. The system as set forth in claim 13, further comprising:

at least one slot defined within said at least one mounting bracket; and at least one fastener disposed within said slot and engaged with said support platform for permitting said at least one mounting bracket to be moved to a selected position when said at least one fastener is disposed in a loosened state with respect to said support platform, and for fixing said at least one mounting bracket at said selected position when said at least one fastener is disposed in a tightened state with respect to said support platform.

15. A two-component mixture dispensing system, comprising:

a first metering pump for dispensing a first component of a two-component mixture;

a second metering pump for dispensing a second component of said two-component mixture;

an air motor;

a hydraulic pump operatively coupled to said air motor so as to be driven by said air motor when said air motor is driven;

a hydraulic drive motor hydraulically connected to said hydraulic pump by a hydraulic fluid conduit so as to be driven by hydraulic fluid transmitted by said hydraulic pump through said hydraulic fluid conduit, and operatively connected to said first and second metering pumps so as to, in turn, drive said first and second metering pumps when said hydraulic drive motor is operatively driven by said hydraulic fluid transmitted by said hydraulic pump through said hydraulic fluid conduit;

a pair of axially spaced sprocket members are mounted upon said hydraulic drive motor;

a first sprocket member is mounted upon said first metering pump;

a second sprocket member is mounted upon said second metering pump; and a first drive chain operatively interconnects a first one of said pair of axially spaced sprocket: members mounted upon said motor and said first sprocket member mounted upon first metering pump, and a second drive chain operatively interconnects a second one of said pair of axially spaced sprocket members mounted upon said hydraulic drive motor and said second sprocket member mounted upon said second metering pump.

16. The system as set forth in claim 15, further comprising:

means for adjustably mounting at least one of said first and second metering pumps with respect to said hydraulic drive motor so as to accommodate different sprocket members for said at least one of said first and second metering pumps with respect to said hydraulic drive motor whereby different amounts of a first one of said first and second components of said two-component mixture, with respect to the second one of said first and second components of said two-component mixture, may be dispensed by said first and second metering pumps.

17. A two-component mixture dispensing system, comprising:

a first metering pump for dispensing a first component of a two-component mixture;

a second metering pump for dispensing a second component of said two-component mixture;

a drive motor for driving said first and second metering pumps;

means for adjustably mounting at least one of said first and second metering pumps with respect to said drive motor so as to accommodate different drive means for said at least one of said first and second metering pumps with respect to said drive motor whereby different amounts of a first one of said first and second components of said two-component mixture, with respect to the second one of said first and second components of said two-component mixture, may be dispensed by said first and second metering pumps;

wherein said adjustable mounting means comprises:
    a support platform; and
    at least one mounting bracket, upon which said at least one of said first and second metering pumps is mounted, movably mounted upon said support platform.

18. The system as set forth in claim 17, further comprising:

at least one slot defined within said at least one mounting bracket; and at least one fastener disposed within said slot and engaged with said support platform for permitting said at least one mounting bracket to be moved to a selected position when said at least one fastener is disposed in a loosened state with respect to said support platform, and for fixing said at least one mounting bracket at said selected position when said at least one fastener is disposed in a tightened state with respect to said support platform.

19. A two-component mixture dispensing system, comprising:

a first metering pump for dispensing a first component of a two-component mixture;

a second metering pump for dispensing a second component of said two-component mixture;

a drive motor for driving said first and second metering pumps;

means for adjustably mounting at least one of said first and second metering pumps with respect to said drive motor so as to accommodate different drive means for said at least one of said first and second metering pumps with respect to said drive motor whereby different amounts of a first one of said first and second components of said two-component mixture, with respect to the second one of said first and second components of said two-component mixture, may be dispensed by said first and second metering pumps;

a pair of axially spaced sprocket members are mounted upon said drive motor;

a first sprocket member is mounted upon said first metering pump; and a second sprocket member is mounted upon said second metering pump; and a first drive chain operatively interconnects a first one of said pair of axially spaced sprocket members mounted upon said drive motor said first sprocket member mounted upon said first metering pump, and a second drive chain operatively interconnects a second one of said pair of axially spaced sprocket members mounted upon said drive motor and said second sprocket member mounted upon said second metering pump.

20. The system as set forth in claim 19, further comprising:

means for adjustably mounting at least one of said first and second metering pumps with respect to said drive motor so as to accommodate different sprocket members for said at least one of said first and second metering pumps with respect to said drive motor whereby different amounts of a first one of said first and second components of said two-component mixture, with respect to the second one of said first and second components of said two-component mixture, may be dispensed by said first and second metering pumps.

21. A two-component mixture dispensing system, comprising:

a first metering pump for dispensing a first component of a two-component mixture;

a second metering pump for dispensing a second component of said two-component mixture;

an air motor;

a hydraulic pump operatively coupled to said air motor so as to be driven by said air motor when said air motor is driven;

a hydraulic drive motor hydraulically connected to said hydraulic pump by a hydraulic fluid conduit so as to be driven by hydraulic fluid transmitted by said hydraulic pump through said hydraulic fluid conduit, and operatively connected to said first and second metering pumps so as to, in turn, drive said first and second metering pumps when said hydraulic drive motor is operatively driven by said hydraulic fluid transmitted by said hydraulic pump through said hydraulic fluid conduit;

a source of high pressure compressed air comprising a pneumatic fluid conduit fluidically connecting said source of high-pressure compressed air to said air motor for supplying pneumatic air from said source of high-pressure compressed air to said motor;

a first two-position directional control valve disposed within said hydraulic fluid conduit fluidically connecting said hydraulic pump to said hydraulic drive motor;

a first compressed air signal line fluidically connecting said pneumatic fluid supply line of said source of high-pressure compressed air to said first two-position directional control valve so as to move said first two-position directional control valve from a CLOSED state, at which hydraulic fluid is prevented from being transmitted from said hydraulic pump to said hydraulic motor, to an OPENED state at which hydraulic fluid is permitted to be transmitted from said hydraulic pump to said hydraulic motor when said first two-position directional control valve receives a first air signal from said source of high-pressure compressed air;

a second two-position directional control valve disposed within said pneumatic fluid supply conduit fluidically connecting said source of high-pressure compresses air to said air motor; and a second compressed air signal line fluidically connecting said pneumatic fluid supply conduit to said second two-position directional control valve so as to move said second two-position directional control valve from a CLOSED state, at which pneumatic fluid is prevented from being transmitted from said source of high-pressure compressed air to said air motor, to an OPENED state at which pneumatic fluid is permitted to be transmitted from said source of high-pressure compresses air to said air motor when said second two-position directional control valve receives a second air signal from said source of high-pressure compressed air.

22. The system as set forth in claim 21, further comprising:

a dispensing gun; and a pneumatic switch mounted upon said dispensing gun for opening and closing said pneumatic fluid supply conduit so as to respectively simultaneously terminate operation of said hydraulic motor and said air motor as a result of deactivation of said first and second two-position directional control valves when said pneumatic switch is disposed at its OPENED state, and to respectively simultaneously initiate operation of said hydraulic motor and said air motor as a result of activation of said first and second two-position directional control valves when said pneumatic switch is disposed at its CLOSED state.

23. The two-component mixture dispensing system of claim 21, further comprising:

means for adjustably mounting at least one of said first and second metering pumps with respect to said drive motor so as to accommodate different drive means for said at least one of said first and second metering pumps with respect to said drive motor whereby different amounts of first and second metering pumps with respect to said drive motor whereby different amounts of a first one of said first and second components of said two-component mixture, with respect to the second one of said first and second components of said two-component mixture, may be dispensed by said first and second metering pumps.

* * * * *